(12) United States Patent
Nakazawa

(10) Patent No.: US 9,959,249 B2
(45) Date of Patent: May 1, 2018

(54) INFORMATION PROCESSING APPARATUS, DOCUMENT PROCESSING APPARATUS, INFORMATION PROCESSING SYSTEM, INFORMATION PROCESSING METHOD, AND DOCUMENT PROCESSING METHOD

(71) Applicant: FUJI XEROX CO., LTD., Minato-ku, Tokyo (JP)

(72) Inventor: Shinsuke Nakazawa, Kanagawa (JP)

(73) Assignee: FUJI XEROX CO., LTD, Minato-ku, Tokyo (JP)

( * ) Notice: Subject to any disclaimer, the term of this patent is extended or adjusted under 35 U.S.C. 154(b) by 30 days.

(21) Appl. No.: 14/461,675

(22) Filed: Aug. 18, 2014

(65) Prior Publication Data

US 2015/0254210 A1 Sep. 10, 2015

(30) Foreign Application Priority Data

Mar. 6, 2014 (JP) ................. 2014-043506

(51) Int. Cl.
*G06F 17/21* (2006.01)
(52) U.S. Cl.
CPC ................. *G06F 17/211* (2013.01)
(58) Field of Classification Search
CPC .................................................. G06F 17/211
USPC ....................................................... 715/249
See application file for complete search history.

(56) References Cited

U.S. PATENT DOCUMENTS

| 2010/0054526 | A1* | 3/2010 | Eckles | H04N 7/147 382/100 |
| 2010/0169792 | A1* | 7/2010 | Ascar | G06F 11/3414 715/744 |
| 2011/0270123 | A1* | 11/2011 | Reiner | A61B 6/463 600/558 |

FOREIGN PATENT DOCUMENTS

| JP | 11-272399 A | 10/1999 |
| JP | 2002-41194 A | 2/2002 |
| JP | 2003-280976 A | 10/2003 |
| JP | 2008-269109 A | 11/2008 |
| JP | 2009-253504 A | 10/2009 |

OTHER PUBLICATIONS

"Why Requirements Approval Matters and How to Make it Easier," TynerBlain, <http://tynerblain.com/blog/2007/01/09/requirements-approval/>, Published: Jan. 9, 2007.*

(Continued)

*Primary Examiner* — Stephen Hong
*Assistant Examiner* — Broderick Anderson
(74) *Attorney, Agent, or Firm* — Sughrue Mion, PLLC

(57) ABSTRACT

An information processing apparatus includes a display that displays a document in response to an instruction from an operator, a retrieval unit that retrieves information related to a region within the displayed document, a duration of time during which the region is displayed, and a resolution at which the region is displayed, and an output unit that outputs the document with the retrieved information related to the region, the duration of time and the resolution associated therewith.

6 Claims, 10 Drawing Sheets

(56) References Cited

OTHER PUBLICATIONS

Communication dated May 23, 2017 from the Japanese Patent Office in counterpart application No. 2014-043506.
Maruyama "AIR for iOS/Android," Mar. 21, 2012, pp. 2-7 (12 pages total).
Akutsu, "Secret of Yoshikazu and Windows 8 Reverse-Lookup Encyclopedia 655", Hidekazu System, Sep. 2, 2013, 1st edition, p. 633 (6 pages total).
Communication dated Dec. 5, 2017, from the Japanese Patent Office in counterpart application No. 2014-043506.

* cited by examiner

Fukushima Machinery Co., Ltd.
1-23-45, Onishi, Yamashiro,
Fukushima Pref., Japan
Tel: +081-123-321-9990   Fax: +081-123-321-9999

AGREEMENT

This Agreement is made by Fukushima Machinery Co., Ltd. (hereinafter referred to as "FMC") and Global Chemical Co., Ltd. (hereinafter referred to as "GCC") as provisions in the Attached Sheet 1 as referred to in Article 6 of the Business Tie-up Agreement dated August 1, 2002.

1. The commission to be paid by GCC to FMC based on transactions shall be calculated based on the net profit obtained by subtracting expenses including freight, insurance, and export and import expenses from the sales profit earned from cleaning services.

2. GCC shall pay to FMC thirty-two percent (32%) equivalent of Net Profit as commission in accordance with the provisions mentioned below.

3. The terms of payment from GCC to FMC shall be that GCC shall pay commissions to FMC in Japanese yen from its Tokyo branch within ten (10) days after receiving charge for cleaning services.

4. Code price shall mean a price deducted from the list price of services by certain percentage (discount rate) and code price for each service shall be as defined in Exhibit A.

5. The exchange rate shall be TTS rate as of the date of the above payment.

6. GCC shall pay the commission minus the withholding tax to FMC.

7. This Agreement shall be effective from the date of commencement of cleaning services.
   The arrangement shall be made separately for the period on and after October 1, 2003.

8. If there is any doubt in this Agreement, FMC and GCC shall consult each other in all sincerity.

IN WITNESS THEREOF, FMC and GCC have caused this Agreement to be executed in duplicate, signed by duly authorized representatives, each having a copy thereof.

July 31, 2008

FMC: *Teruhisa Isono*
Teruhisa Isono, President
Fukushima Machinery Co., Ltd.
1-23-45, Onishi, Yamashiro,
Fukushima Pref.

GCC: *Michael Johnson*
Michael Johnson, CEO
Global Chemical Co., Ltd.
12, Canadian Street, San Diego
CA 92111, U.S.A.

FIG. 9

Fukushima Machinery Co., Ltd.
1-23-45, Onishi, Yamashiro,
Fukushima Pref., Japan
Tel: +081-123-321-9990  Fax: +081-123-321-9999

800

AGREEMENT

This Agreement is made by Fukushima Machinery Co., Ltd. (hereinafter referred to as "FMC") and Global Chemical Co., Ltd. (hereinafter referred to as "GCC") as provisions in the Attached Sheet 1 as referred to in Article 6 of the Business Tie-up Agreement dated August 1, 2002. — 910

1. The commission to be paid by GCC to FMC based on transactions shall be calculated based on the net profit obtained by subtracting expenses including freight, insurance, and export and import expenses from the sales profit earned from cleaning services.

— 920

2. GCC shall pay to FMC thirty-two percent (32%) equivalent of Net Profit as commission in accordance with the provisions mentioned below.

3. The terms of payment from GCC to FMC shall be that GCC shall pay commissions to FMC in Japanese yen from its Tokyo branch within ten (10) days after receiving charge for cleaning services.

4. Code price shall mean a price deducted from the list price of services by certain percentage (discount rate) and code price for each service shall be as defined in Exhibit A.

5. The exchange rate shall be TTS rate as of the date of the above payment.

6. GCC shall pay the commission minus the withholding tax to FMC. — 930

7. This Agreement shall be effective from the date of commencement of cleaning services. The arrangement shall be made separately for the period on and after October 1, 2003. — 940

8. If there is any doubt in this Agreement, FMC and GCC shall consult each other in all sincerity.

IN WITNESS THEREOF, FMC and GCC have caused this Agreement to be executed in duplicate, signed by duly authorized representatives, each having a copy thereof.

July 31, 2008

FMC: *[signature]*
Teruhisa Isono, President
Fukushima Machinery Co., Ltd.
1-23-45, Onishi, Yamashiro,
Fukushima Pref.

GCC: *[signature]*
Michael Johnson, CEO
Global Chemical Co., Ltd.
12, Canadian Street, San Diego
CA 92111, U.S.A.

Fukushima Machinery Co., Ltd.
1-23-45, Onishi, Yamashiro,
Fukushima Pref., Japan
Tel: +081-123-321-9990  Fax: +081-123-321-9999

AGREEMENT
1010

This Agreement is made by Fukushima Machinery Co., Ltd. (hereinafter referred to as "FMC") and Global Chemical Co., Ltd. (hereinafter referred to as "GCC") as provisions in the Attached Sheet 1 as referred to in Article 6 of the Business Tie-up Agreement dated August 1, 2002.

1. The commission to be paid by GCC to FMC based on transactions shall be calculated based on the net profit obtained by subtracting expenses including freight, insurance, and export and import expenses from the sales profit earned from cleaning services.

2. GCC shall pay to FMC thirty-two percent (32%) equivalent of Net Profit as commission in accordance with the provisions mentioned below.

3. The terms of payment from GCC to FMC shall be that GCC shall pay commissions to FMC in Japanese yen from its Tokyo branch within ten (10) days after receiving charge for cleaning services.

4. Code price shall mean a price deducted from the list price of services by certain percentage (discount rate) and code price for each service shall be as defined in Exhibit A.

5. The exchange rate shall be TTS rate as of the date of the above payment.

6. GCC shall pay the commission minus the withholding tax to FMC.

7. This Agreement shall be effective from the date of commencement of cleaning services. The arrangement shall be made separately for the period on and after October 1, 2008.

8. If there is any doubt in this Agreement, FMC and GCC shall consult each other in all sincerity.

IN WITNESS THEREOF, FMC and GCC have caused this Agreement to be executed in duplicate, signed by duly authorized representatives, each having a copy thereof.

July 31, 2008

FMC: *Teruhisa Isono*

Teruhisa Isono, President
Fukushima Machinery Co., Ltd.
1-23-45, Onishi, Yamashiro,
Fukushima Pref.

GCC: *Michael Johnson*

Michael Johnson, CEO
Global Chemical Co., Ltd.
12, Canadian Street, San Diego
CA 92111, U.S.A.

INFORMATION PROCESSING APPARATUS, DOCUMENT PROCESSING APPARATUS, INFORMATION PROCESSING SYSTEM, INFORMATION PROCESSING METHOD, AND DOCUMENT PROCESSING METHOD

CROSS-REFERENCE TO RELATED APPLICATIONS

This application is based on and claims priority under 35 USC 119 from Japanese Patent Application No. 2014-043506 filed Mar. 6, 2014.

BACKGROUND

Technical Field

The present invention relates to an information processing apparatus, a document processing apparatus, an information processing system, an information processing method, and a document processing method.

SUMMARY

According to an aspect of the invention, there is provided an information processing apparatus including a display that displays a document in response to an instruction from an operator, a retrieval unit that retrieves information related to a region within the displayed document, a duration of time during which the region is displayed, and a resolution at which the region is displayed, and an output unit that outputs the document with the retrieved information related to the region, the duration of time and the resolution associated therewith.

BRIEF DESCRIPTION OF THE DRAWINGS

Exemplary embodiments of the present invention will be described in detail based on the following figures, wherein:

FIG. 8 illustrates a process example of the exemplary embodiment;

FIG. 9 illustrates a process example of the exemplary embodiment;

FIG. 10 illustrates a process example of the exemplary embodiment; and

DETAILED DESCRIPTION

An exemplary embodiment of the present invention is described below with reference to the drawings.

Figure 1:
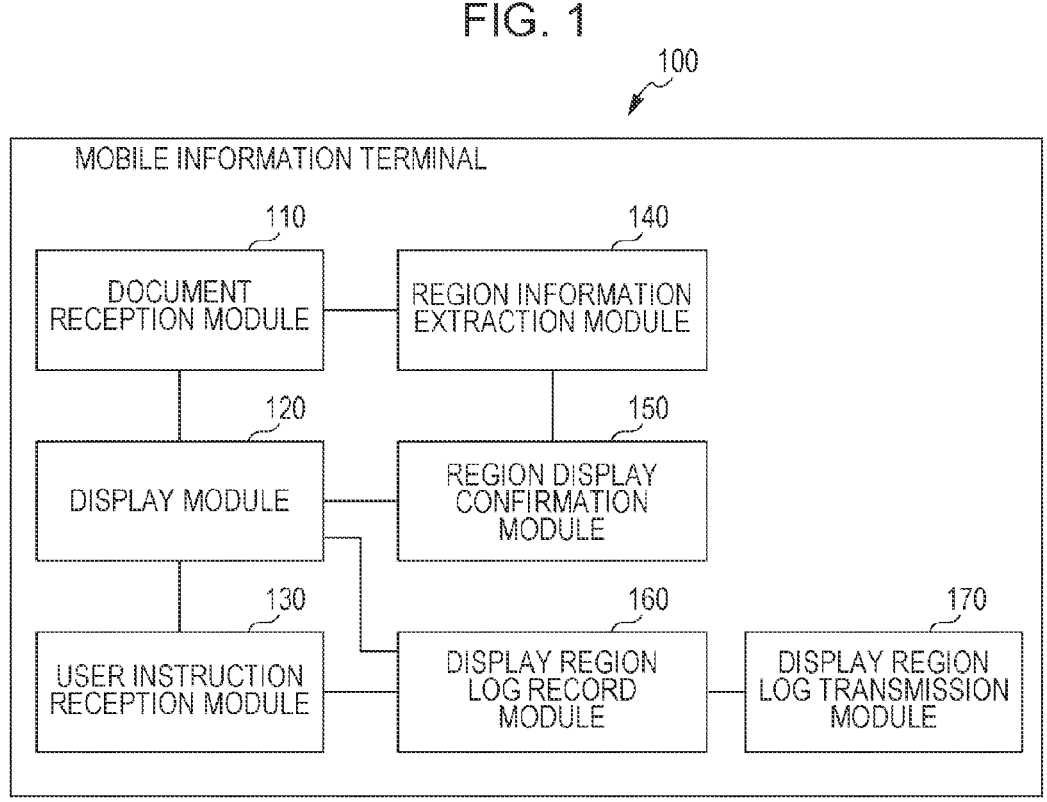
FIG. 1 illustrates a module configuration of a mobile information terminal of an exemplary embodiment.
Figure 2:
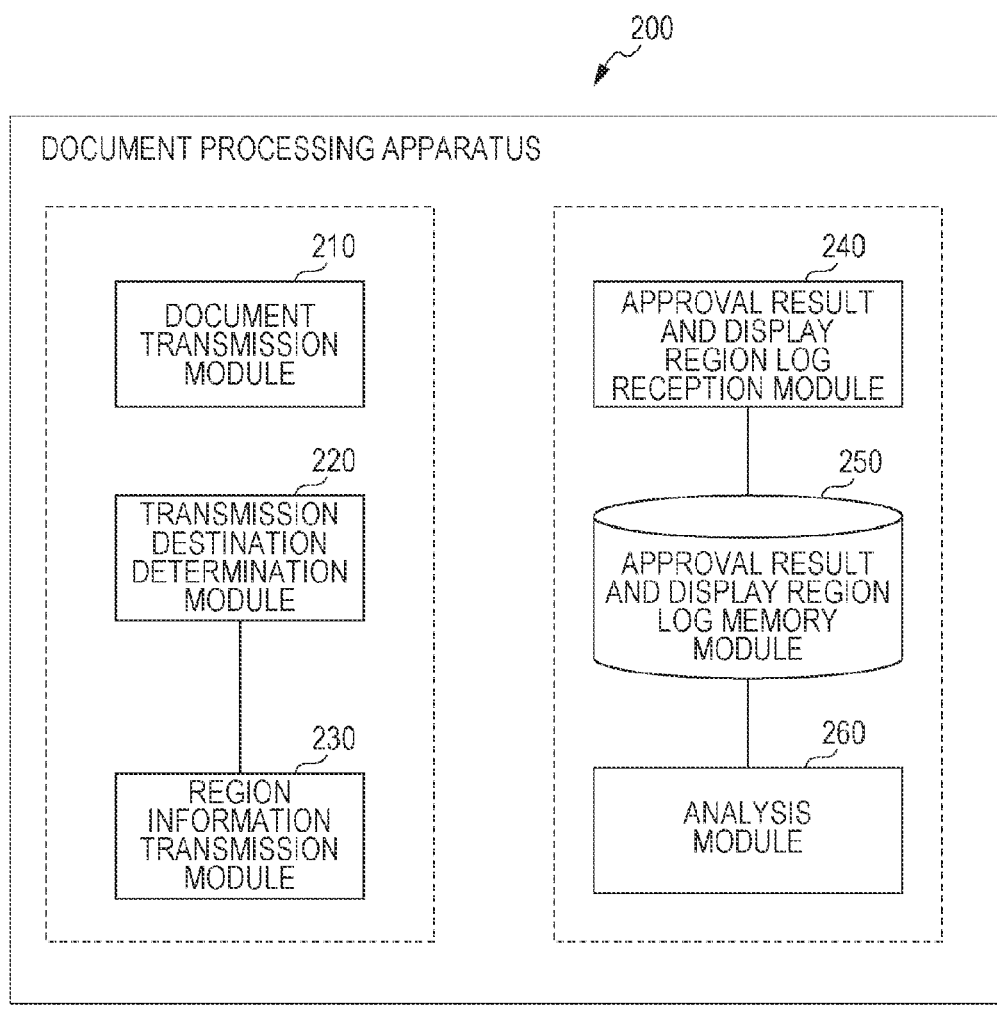
FIG. 2 illustrates a module configuration of a document processing apparatus of the exemplary embodiment.

FIG. 1 and FIG. 2 illustrate a module configuration of the exemplary embodiment.

The term "module" refers to a software component that is logically separable (a computer program), or a hardware component. The module of the exemplary embodiment refers to not only a module in a computer program but also a module in a hardware configuration. The discussion of the exemplary embodiment also serves as the discussion of computer programs for causing the modules to function (including a program that causes a computer to execute each step, a program that causes the computer to function as an element, and a program that causes the computer to implement each function), a system and a method. In the discussion that follows, the phrases "stores information," "causes information to be stored," and other phrases equivalent thereto are used. If the exemplary embodiment is a computer program, these phrases are intended to express "causes a memory device to store information" or "controls a memory device to cause the memory device to store information." The modules may correspond to the functions in a one-to-one correspondence. In a software implementation, one module may be composed of one program or multiple modules may be composed of one program. One module may be composed of multiple programs. Multiple modules may be executed by a single computer. A single module may be executed by multiple computers in a distributed environment or a parallel environment. One module may include another module. In the discussion that follows, the term "connection" refers to not only a physical connection but also a logical connection (such as an exchange of data, instructions, and data reference relationship). The term "predetermined" means that something is decided in advance of a process of interest. The term "predetermined" is thus intended to refer to something that is decided in advance of a process of interest in the exemplary embodiment. Even after a process in the exemplary embodiment has started, the term "predetermined" refers to something that is decided in advance of a process of interest depending on a condition or a status of the exemplary embodiment at the present point of time or depending on a condition or status heretofore continuing down to the present point of time. If "predetermined values" are plural, the predetermined values may be different from each other, or two or more of the predetermined values (including all the values) may be equal to each other. A statement that "if A, B is to be performed" is intended to mean that it is determined whether something is A, and that if something is determined as A, an action B is to be carried out. The statement becomes meaningless if the determination as to whether something is A is not performed.

The term "system" and the term "apparatus" refer to an arrangement where multiple computers, a hardware configuration, and an apparatus are interconnected via a communication network (including a one-to-one communication connection). The term "system" and the term "apparatus" also refer to an arrangement that includes a single computer, a hardware configuration, and an apparatus. The term "system" and the term "apparatus" have the same definition and are interchangeable with each other. The system in the context of the exemplary embodiment does not include a social system that is a social arrangement formulated by humans.

At each process performed by a module, or at one of the processes performed by a module, information as a process target is read from a memory device, the information is then processed, and the process results are written onto the memory device. A description related to the reading of the information from the memory device prior to the process and the writing of the processed information onto the memory device subsequent to the process may be omitted as appropriate. The memory devices may include a hard disc, a random-access memory (RAM), an external storage medium, a memory device connected via a communication network, and a register within a central processing unit (CPU).

A mobile information terminal 100 of the exemplary embodiment displays a document. As illustrated in FIG. 1, the mobile information terminal 100 includes a document reception module 110, a display module 120, a user instruction reception module 130, a region information extraction module 140, a region display confirmation module 150, a display region log record module 160, and a display region log transmission module 170. To verify the content of a document, the mobile information terminal 100 is used to display a document that a display of the mobile information terminal 100 is not large enough to fully accommodate. Typically, the exemplary embodiment is applicable to display a document larger than the size of the display of the mobile information terminal 100. In other words, displaying the document is displaying part of the document.

The mobile information terminal 100 is described herein, but may be a desk-top information processing apparatus. For example, the exemplary embodiment is applicable to an information processing apparatus having a display as large as 20 inches. For example, a document as large as an A1 sheet size may be possibly displayed.

The document reception module 110 is connected to the display module 120 and the region information extraction module 140. The document reception module 110 receives a document. The document to be received may include information related to a region that is to be displayed. The document is the one transmitted by the document transmission module 210 to be described below in the document processing apparatus 200.

The document may be digital data that may be displayed on the display of the mobile information terminal 100, and includes text data, an image, drawings, and a moving image. The document may also include digital data, such as an audio. The document serves as a target of storage, editing, and search, and may be an individual unit that may be exchangeable between systems or users. The document also includes an entity similar to these objects. More specifically, the document may include a document produced in accordance with a document production program, and a web page. Described below is a document that is to be approved by the operator of the mobile information terminal 100.

The display module 120 is connected to the document reception module 110, the user instruction reception module 130, the region display confirmation module 150, and the display region log record module 160. The display module 120 displays the document received by the document reception module 110 on the display of the mobile information terminal 100 in response to an instruction of the operator.

The user instruction reception module 130 is connected to the display module 120, and the display region log record module 160. The user instruction reception module 130 receives an operation of the operator of the mobile information terminal 100. Instructions of the operator respond to an operation of the operator who operates a user interface device, such as a touchpanel of the mobile information terminal 100 or a keyboard and a mouse. The operations include scrolling of the document, expansion and contraction of the document. If a document is to be approved, the operations to be performed includes approving, rejecting, or returning.

The region information extraction module 140 is connected to the document reception module 110, and the region display confirmation module 150. If information related to a region to be displayed is attached to the document received by the document reception module 110, the region information extraction module 140 extracts that information. The display module 120 displays the region of the document in accordance with the information. The "attached" information is intended to mean that that information is embedded in the document. By receiving the document, the information is also received. Alternatively, the document and the information may be separately received, and then the information may be associated with the document. In such a case, the attached information includes information identifying the document (a document identification (ID) identifying the document).

The information may include information related to the order of displaying. The display module 120 display the regions in accordance with the order.

The region display confirmation module 150 is connected to the display module 120 and the region information extraction module 140. Based on the information related to the region extracted by the region information extraction module 140, the region display confirmation module 150 determines whether the display module 120 has displayed the region. The region has not been displayed when the document is closed. When the document is closed in such a case, a message reading that the region has not been displayed may be displayed. Text data to the effect that the region has not been displayed may be displayed or a voice message to the effect may be output from a speaker. A vibrator of the mobile information terminal 100 may be activated to alert the user to the region not displayed. These operations may be combined.

The display region log record module 160 is connected to the display module 120, the user instruction reception module 130, and the display region log transmission module 170. The display region log record module 160 retrieves and records, as a log, information related to the region in the document displayed in the display of the mobile information terminal 100 by the display module 120, a duration of time during which the region is displayed, a resolution at which the region is displayed. The resolution does not indicate a resolution of the display of the mobile information terminal 100 but the number of pixels displayed per unit area in the document when the document is displayed on the display of the mobile information terminal 100. For example, a document having an A4 sheet size may now be displayed on a screen of about 4 inches. If the entire document is displayed on the whole screen, the resolution is then about 80 dpi. If a region equal to a quarter of the A4 sheet size is displayed on the whole screen, the resolution is about 160 dpi. The latter resolution allows a reader to reliably read information of the document. The inch of "dpi" as unit of resolution is the inch on the original document. If the resolution is equal to or above a predetermined value, the document is large enough for the reader to read.

The display region log transmission module 170 is connected to the display region log record module 160. The display region log transmission module 170 outputs information related to a region recorded by the display region log record module 160, a duration of time during which the region is displayed, and a resolution at which the region is displayed. The information is output with the displayed document associated therewith. The output destination is an approval result and display region log reception module 240 in a document processing apparatus 200 described below.

The document processing apparatus 200 of the exemplary embodiment analyzes transmission of a document and displaying of the document. As illustrated in FIG. 2, the document processing apparatus 200 includes a document transmission module 210, a transmission destination determination module 220, a region information transmission module 230, an approval result and display region log reception module 240, an approval result and display region log memory module 250, and an analysis module 260. The document transmission module 210, the transmission destination determination module 220, and the region information transmission module 230 are a module group that transmits a document displayed by the mobile information terminal 100. The approval result and display region log reception module 240, the approval result and display region log memory module 250, and the analysis module 260 are a module group that analyzes the document displayed by the mobile information terminal 100.

The document transmission module 210 transmits a document to the document reception module 110 in the mobile information terminal 100. For example, if a document is to be approved, the document is mailed to a mail address of an approver.

The transmission destination determination module 220 is connected to the region information transmission module 230. The transmission destination determination module 220 determines whether to transmit information related to a region that is to be displayed by a transmission destination of the document transmitted by the document transmission module 210 (hereinafter referred to as region information). For example, the transmission destination determination module 220 detects the size of a display of an apparatus as a transmission destination. If the apparatus as the transmission destination does not include a display large enough to verify the contents of the document transmitted from the document transmission module 210, the transmission destination determination module 220 determines that the region information is to be transmitted. The transmission destination determination module 220 may also determine whether the apparatus as the transmission destination is a mobile device. If the apparatus as the transmission destination is a mobile device, the transmission destination determination module 220 determines that the region information is to be transmitted. The information related to the region to be displayed is specified with respect to the document through the operation of the operator of the document processing apparatus 200. For example, the information related to the region is coordinates information of a given region the approver needs to see before approving the document. In order to detect the apparatus as the transmission destination, the document processing apparatus 200 communicates with the mobile information terminal 100 to retrieve information related to the display of the mobile information terminal 100 or information as to whether the mobile information terminal 100 is a mobile device. Alternatively, a table storing a mail address and device information in association with each other is prepared in advance, and device information as a transmission destination is retrieved by searching the table.

The region information transmission module 230 is connected to the transmission destination determination module 220. If the transmission destination determination module 220 determines that the region information is to be transmitted, the region information transmission module 230 transmits the region information of the document as a target to the document reception module 110 in the mobile information terminal 100. If the transmission destination determination module 220 determines that the region information is to be transmitted, the document transmission module 210 embeds the region information in the document and then transmits the resulting document to the document reception module 110 in the mobile information terminal 100.

The approval result and display region log reception module 240 is connected to the approval result and display region log memory module 250. The approval result and display region log reception module 240 receives information related to the region output by the display region log transmission module 170 in the mobile information terminal 100, the duration of time during which the region is displayed, and the resolution at which the region is displayed.

The approval result and display region log memory module 250 is connected to the approval result and display region log reception module 240, and the analysis module 260. The approval result and display region log memory module 250 stores the information related to the region, the duration of time, and the resolution received by the approval result and display region log reception module 240.

The analysis module 260 is connected to The approval result and display region log memory module 250. The analysis module 260 compares the information related to the region, the duration of time, and the resolution stored on the approval result and display region log memory module 250 with information related to a region, a duration of time, and a resolution predetermined in the document as a target. More specifically, the analysis module 260 determines whether the region predetermined in the document as the target is displayed for a predetermined duration of time or longer and at a predetermined resolution or higher on the mobile information terminal 100.

Figure 3:
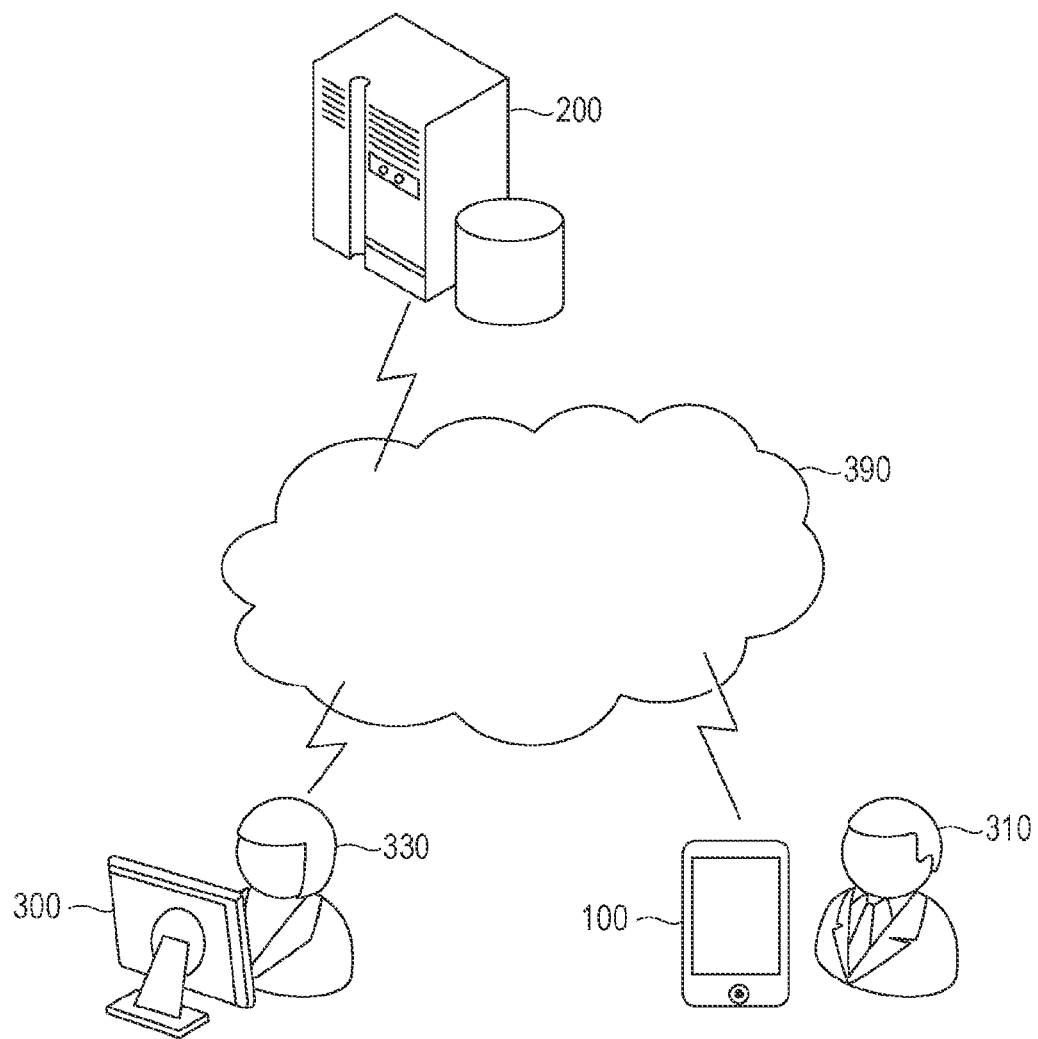
FIG. 3 illustrates a system configuration of the exemplary embodiment.

FIG. 3 illustrates a system configuration of the exemplary embodiment.

The mobile information terminal 100, the document processing apparatus 200, and a terminal (client) 300 are interconnected to each other through a communication network 390. The communication network 390 may be a wired network, a wireless network, or a combination thereof. For example, the communication network 390 may be the Internet as a communication infrastructure.

The document processing apparatus 200 stores the document, records viewing history, and performs approval request/confirmation.

The client terminal 300 is used by a user 330, creates or edits a document, specifies an item of higher value, and confirms or displays viewing history.

The mobile information terminal 100 is used by an approver 310, and views or edits a document, records viewing time, region, and resolution, and displays approval user interface (UI).

More specifically, the following operations are performed.

The document processing apparatus 200 receives from the client terminal 300 a registration (upload) of a document file, and stores the document on a storage area thereof.

The document processing apparatus 200 downloads a document in response to a request from the client terminal 300 or the mobile information terminal 100.

If a document needs to be approved, the document processing apparatus 200 issues an approval request. The document processing apparatus 200 also records approval results from the client terminal 300 or the mobile information terminal 100.

The document processing apparatus 200 records the viewing history of the document.

The approver 310 is superior to the user 330 who requests the approval of a document.

The client terminal 300 creates or edits a document in response to an operation of the user 330, and then registers the document in the document processing apparatus 200.

The client terminal 300 specifies the region information as an item of higher value in the document in response to the operation of the user 330.

The client terminal 300 confirms the viewing history of the document processing apparatus 200.

The mobile information terminal 100 downloads a document from the document processing apparatus 200 and causes the display of the mobile information terminal 100 to display the document.

The mobile information terminal 100 records the displayed region, the resolution of the region, and the viewing time, and then uploads these pieces of information to the document processing apparatus 200.

If the document needs to be approved, the mobile information terminal 100 causes the display to display an approval user interface. The mobile information terminal 100 notifies the document processing apparatus 200 of the approval results.

Figure 4:
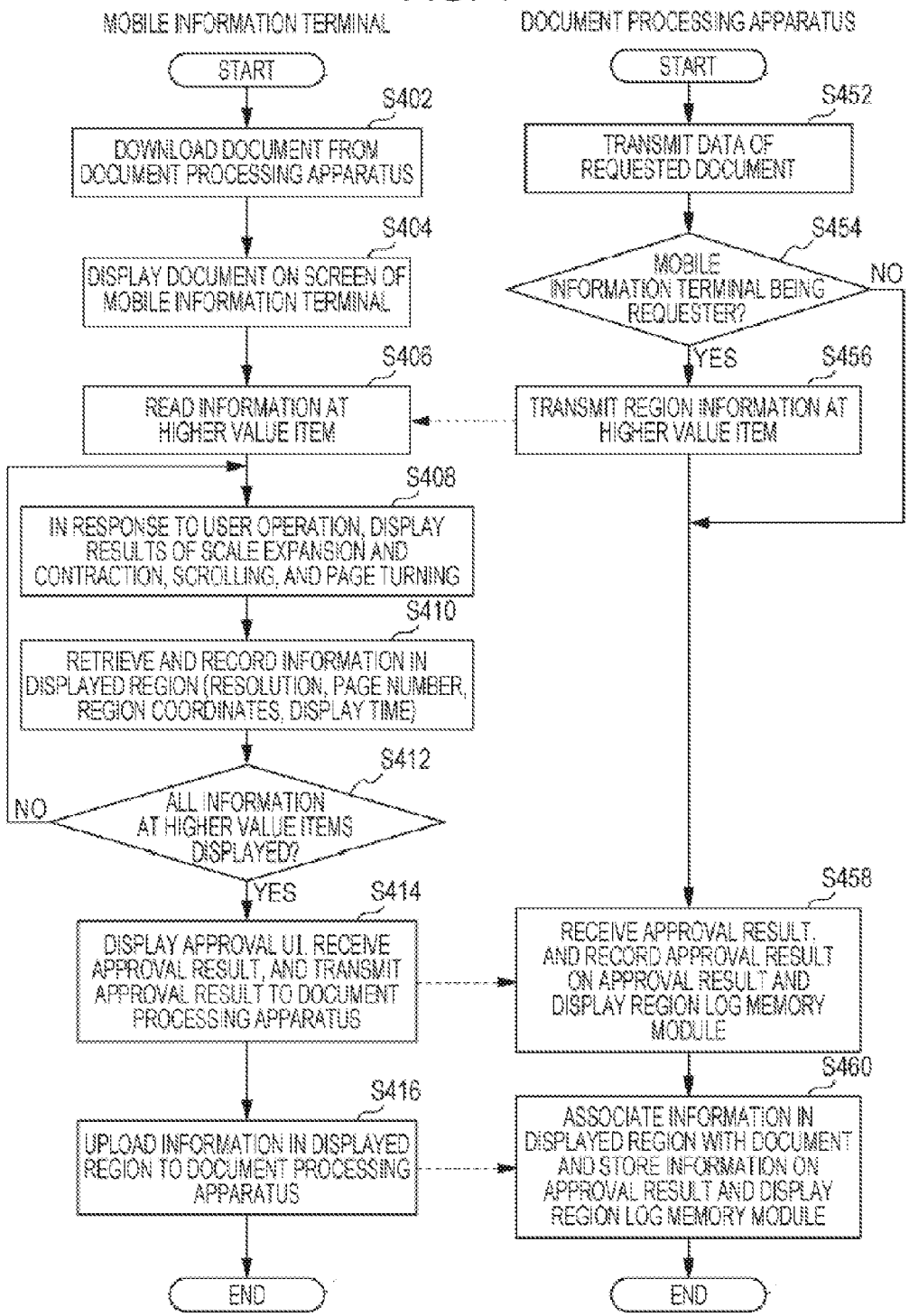
FIG. 4 is a flowchart illustrating a process example of the exemplary embodiment.

FIG. 4 is a flowchart illustrating a process example of the exemplary embodiment. A left-hand portion of the flowchart of FIG. 4 indicates a process performed by the mobile information terminal 100 and a right-hand portion of the flowchart indicates a process performed by the document processing apparatus 200.

The process flow of the mobile information terminal 100 is described first.

In step S402, the document reception module 110 downloads a document from the document processing apparatus 200. More specifically, an application of the mobile information terminal 100 establishes connection to the document processing apparatus 200 to download the document.

In step S404, the display module 120 causes the document to be displayed on the screen of the mobile information terminal 100.

In step S406, the region information extraction module 140 reads (receives) the region information at the item of higher value in the document transmitted in step S456.

In step S408, the user instruction reception module 130 receives a user operation, and the display module 120 displays results of expansion, contraction, scrolling or page turning operation. More specifically, the user operates the mobile information terminal 100, thereby expanding or contracting a page of the document, or scrolling the document to shift a display region, or turning page.

In step S410, the display region log record module 160 acquires and records information of the displayed region (a resolution, a page number, region coordinates, and a display time). A display region that remains displayed for a duration shorter than a predetermined time in response to flick scrolling, for example, may not necessarily be recorded.

In step S412, the region display confirmation module 150 determines whether the regions indicated by the region information at the items of higher value are displayed. If the regions are displayed, processing proceeds to step S414. Otherwise, processing returns to step S408. More specifically, information related to the region displayed in response to the user operation is compared with pre-read information at the item of higher value. If it is verified that the item of higher value is equal to or above the predetermined resolution, and is displayed for the predetermined period of time or longer, the approval UI is displayed.

In step S414, the user instruction reception module 130 displays the approval UI, receives an approval result responsive to an approval operation of the user, and then transmits the approval result to the document processing apparatus 200.

In step S416, the display region log transmission module 170 uploads information of the displayed region to the document processing apparatus 200. More specifically, when the viewing of the document is terminated in response to the user operation, the information of the region displayed heretofore is uploaded to the document processing apparatus 200.

A process flow of the document processing apparatus 200 is described below.

In step S452, the document transmission module 210 transmits data of a requested document. More specifically, the document transmission module 210 tries to search for the document requested by the mobile information terminal 100 in a storage area thereof, and then returns the found document. More specifically, the document transmission module 210 determines, based on information, such as UserAgent, whether the requester is the mobile information terminal 100.

In step S454, the transmission destination determination module 220 determines whether the requester is the mobile information terminal 100. If the requester is the mobile information terminal 100, processing proceeds to step S456. Otherwise, processing proceeds to step S458.

Figure 7:
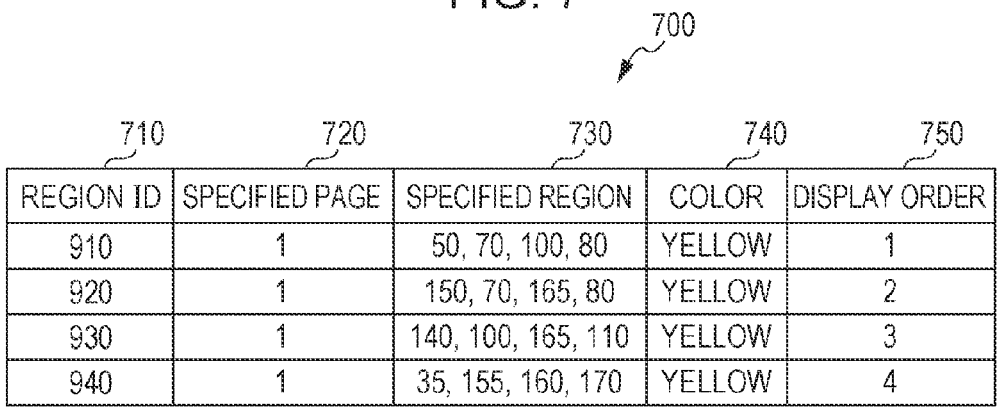
FIG. 7 illustrates an example of a data structure of the display region table.

In step S456, the region information transmission module 230 transmits the region information at the item of higher value. More specifically, if it is determined in step S454 that the requester is the mobile information terminal 100, the region information transmission module 230 searches for the region information at the item of higher value associated with the document within the storage area thereof, and then returns the data of the region information. For example, the region information transmission module 230 transmits a specified region table 700. FIG. 7 illustrates an example of a data structure of the specified region table 700. The specified region table 700 is created on a per document basis, and includes a region ID column 710, a specified page column 720, a specified region column 730, a color column 740, and a display order column 750. The region ID column 710 stores information uniquely identifying a region (region identification (ID)) in the exemplary embodiment. The specified page column 720 stores a specified page having the region therewithin. The specified region column 730 stores a specified region. More specifically, the specified region column 730 stores coordinates of the top-right corner and the bottom-left corner of a rectangle. The color column 740 stores a color of the background of the region displayed. The display order column 750 stores the display order of the region. In accordance with the display order, the region is displayed on the display of the mobile information terminal 100 at a resolution equal to or above the predetermined resolution. More specifically, the specified region table 700 of FIG. 7 stores four pieces of region information. A region having a region ID 710 at a first row is a region surrounded by coordinates (50, 70, 100, 80) on a first page with a background color of yellow, and is to be displayed first from among the four regions.

In step S458, the approval result and display region log reception module 240 receives the approval result transmitted in step S414, and stores the approval result on the approval result and display region log memory module 250.

More specifically, if the approval UI is displayed on the mobile information terminal 100 based on information of the item of higher value and a display status, the approval result and display region log reception module 240 receives the approval result, and then stores the result on the approval result and display region log memory module 250.

Figure 6:
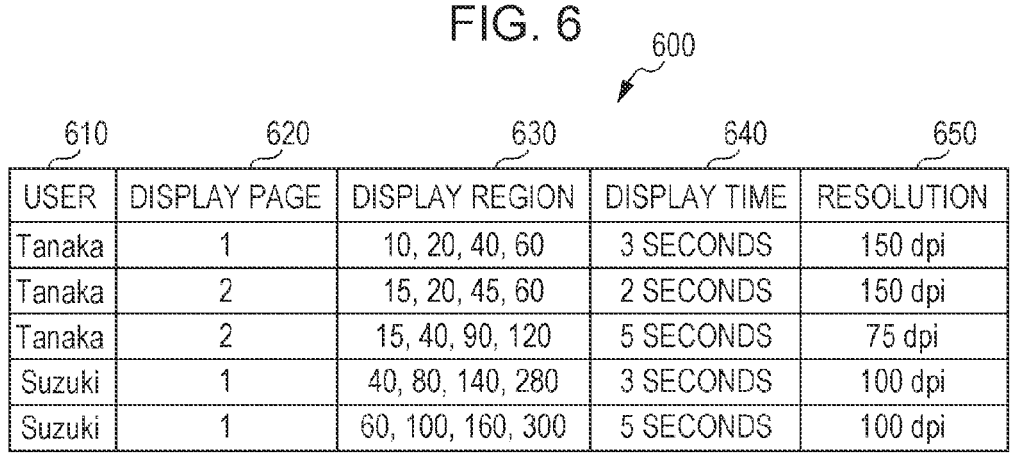
FIG. 6 illustrates an example of a data structure of a display region table.

In step S460, the approval result and display region log reception module 240 records on the approval result and display region log memory module 250 the information of the displayed region transmitted in step S416 and associated with the document. More specifically, when the user terminates the viewing on the mobile information terminal 100, the approval result and display region log reception module 240 receives the information of the regions heretofore displayed and records the information with the original document associated therewith. For example, a display region table 600 is recorded. FIG. 6 illustrates an example of a data structure of the display region table 600. The display region table 600 is created on a per document basis. The display region table 600 includes a user column 610, a display page column 620, a display region column 630, a display time column 640, and a resolution column 650. The user column 610 stores the name of a user who has viewed the document (a holder of the mobile information terminal 100 displaying the document). The display page column 620 stores a page that is displayed of the document. The display region column 630 stores the displayed region of the page. More specifically, the display region column 630 stores coordinates of the top-right corner and the bottom-left corner of a rectangle. If the comparison of the display region column 630 with the specified region column 730 of the specified region table 700 indicates an inclusion relationship that a display region of the display region column 630 includes a region of the specified region column 730, the region is determined as being read. The display time column 640 stores a duration of time during which the region is read. If the duration of time is equal to or above a predetermined value, the region is determined as being read. The resolution column 650 stores a resolution at which the region is displayed.

Figure 5:
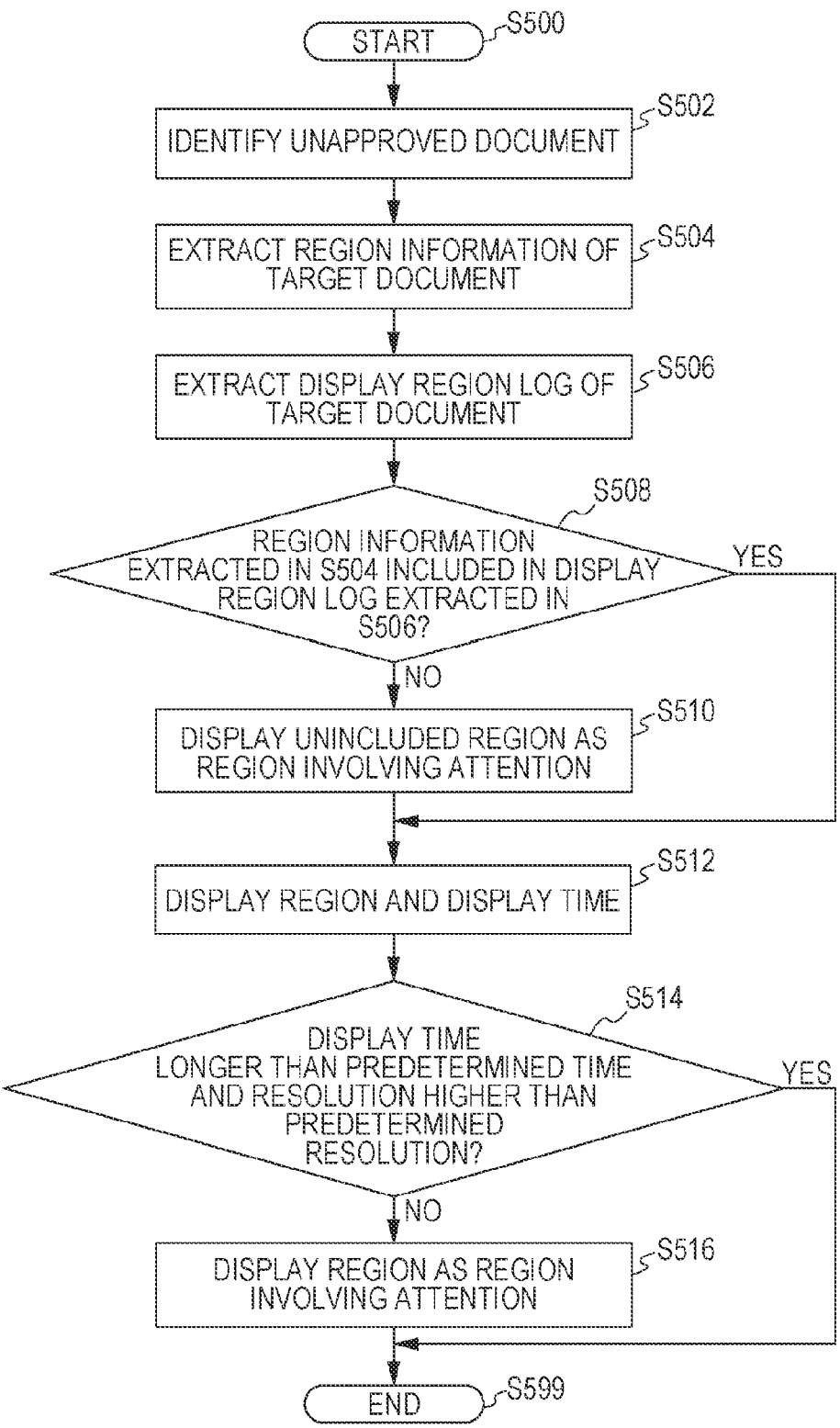
FIG. 5 is a flowchart illustrating a process example of the exemplary embodiment.

FIG. 5 is a flowchart illustrating a process example of the exemplary embodiment.

In step S502, the analysis module 260 identifies a document that has not been approved. The analysis module 260 may identify the document in response to an instruction from the operator or may successively identify documents that have not undergone the process of FIG. 5.

In step S504, the analysis module 260 extracts the region information of a target document (the specified region table 700).

In step S506, the analysis module 260 extracts a display region log of a target document (the display region table 600).

In step S508, the analysis module 260 determines whether the region information extracted in step S504 is included in the display region log extracted in step S506. If the region information extracted in step S504 is included in the display region log extracted in step S506, processing proceeds to step S512; otherwise, processing proceeds to step S510.

In step S510, the analysis module 260 displays a region not included as a region involving attention. More specifically, the analysis module 260 indicates that that region is a region not yet read.

In step S512, the analysis module 260 displays the region and the display time.

In step S514, the analysis module 260 determines whether the display time is longer than the predetermined time and whether the resolution is higher than the predetermined solution. If this condition is satisfied, the process ends (step S599); otherwise, processing proceeds to step S516.

In step S516, that region is displayed as being a region involving attention. More specifically, the analysis module 260 indicates a possibility that the region has not been read. Since the region is not displayed in step S510, it is certain that the region has not been read. In step S516, however, there is a high possibility that the region is displayed but not read, and the region may be displayed in a form different from the region in step S510.

Examples illustrated in FIG. 8 through FIG. 10 are described below.

A planner (the user 330) may now create a document (agreement) 800 of FIG. 8, and submit the agreement 800 to superiors or related departments (the approver 310) for approval.

In the exemplary embodiment, an annotation marker is prepared on the agreement 800 to identify an item of higher value. The item of higher value in this approval process is annotated with a mark by the planner. As illustrated in FIG. 9, specified regions 910, 920, 930, and 940 are annotated. The annotation with the mark is an operation of generating the specified region table 700. More specifically, the annotation with the mark specifies the specified page column 720 and the specified region column 730 in the specified region table 700. The color column 740 is generated by specifying a color to display the region in the mobile information terminal 100, and the display order column 750 is generated in accordance with the order of displaying the region in the mobile information terminal 100 (the order of displaying the region may be the order of specifying the region).

There are cases that the agreement 800 complying with a standard rule is to be free from such a mark. In such a case, the annotation with the mark may be stored at an invisible layer, or the annotated data may be stored at a separate file.

The document is annotated on the item of higher value and the resulting agreement 800 is registered on the document processing apparatus 200 in response to the operation of the planner. The planner then issues an approval request.

The document processing apparatus 200 transmits the approval request by mail to the approver 310.

The approver 310 may be on a business trip or out of the office and may carry only the mobile information terminal 100. The approver 310 may receive the mail on the mobile information terminal 100, and download the agreement 800 from the document processing apparatus 200 for viewing.

The agreement 800 is in a standard form filled with detailed information. If the approver 310 attempts to view the mobile information terminal 100 in a small screen, the mobile information terminal 100 is almost illegible in the whole presentation thereof. If the document is expanded, the current display region is difficult to track in the entire document. The user may be unsure of viewing correctly a portion of higher value of the document. More specifically, if a mobile terminal, such as a cellular phone having a small-size screen (including a smartphone), is requested to view or approve a document, the requester may learn that the document has been viewed but may be unsure whether the item of higher value of the document has been actually viewed. The requested party may also be unsure of which portion of the document in the small screen is of higher value. The exemplary embodiment is not limited to the mobile terminal.

In one process example of the mobile information terminal 100, the approval UI may be displayed if it is verified that the item of higher value has been displayed at a resolution equal to or above a specific resolution and for a duration of time equal to or longer a specific duration of time. This operation may be performed by comparing the information at the item of higher value with the information of the display region of the mobile information terminal 100. An ordinary operation other than the approval operation, such as posting a comment, may also be included In another process example, upon reading the information at the item of higher value, the mobile information terminal 100 may successively and automatically display the information at a resolution equal to or above the specific resolution.

The log of the display region (the display region table 600) registered on the document processing apparatus 200 is recorded in principle by coordinates information or resolution information. The coordinates information or resolution information may be used to visually display a region which has been displayed. As illustrated in FIG. 10, a displayed region (display region 1010) may be colored in green, for example.

If the document is to be approved by multiple persons, the log of the display region may be stored as the display region table 600 on a per user account basis. In order to learn who has approved which region of the document, the log of the display region may be changed in color from the approver 310 to the approver 310 based on the approval results.

The item of higher value to the approver 310 may be differentiated depending on the approver 310 so that only the item of really higher value to the approver 310 is viewed by a smaller number of operations.

To cause the document to be approved on the mobile information terminal 100 in the exemplary embodiment, a complete approval UI is displayed on the document processing apparatus 200 only after the item of higher value is displayed at a resolution equal to or above the specific resolution or higher and for the specific duration of time or longer. Alternatively, when the mobile information terminal 100 is used to review the document, a review comment input UI may be displayed if the item of higher value is displayed at the resolution equal to or above the specific resolution and for the specific duration of time or longer.

The mobile information terminal 100 may be used to review the document with no item of higher value specified. In such a case, a region displayed at the resolution equal to or above the specific resolution and for the specific time or longer may be recorded, and the record results may be registered on the document processing apparatus 200.

An item of higher value may be predetermined in a document having a fixed format, serving as a registration document class, such as a report. This arrangement sets the requester free from an operation of specifying the item of higher value each time. Also, the region of each registered document viewed on the mobile information terminal 100 in the registration document class is recorded, reference locations are then accumulated in the registration document class, and then machine learning is performed in order to identify the item of higher value.

An appropriate resolution (or expansion rate) may be calculated from a font size and the number of characters included in the item of higher value.

The log of the display region may be recorded on a per user basis or on a per approval phase basis, and is then confirmed by differentiating from user to user or from approval phase to approval phase. In response to such differentiation, the page of the document may be visually displayed in a different color from user to user or from approval phase to approval phase. The item of higher value in the document may be specified separately on each user or on each approval phase. In response to the specified information, the item of higher value only to the user or only to the approval phase may be identified.

Figure 11:
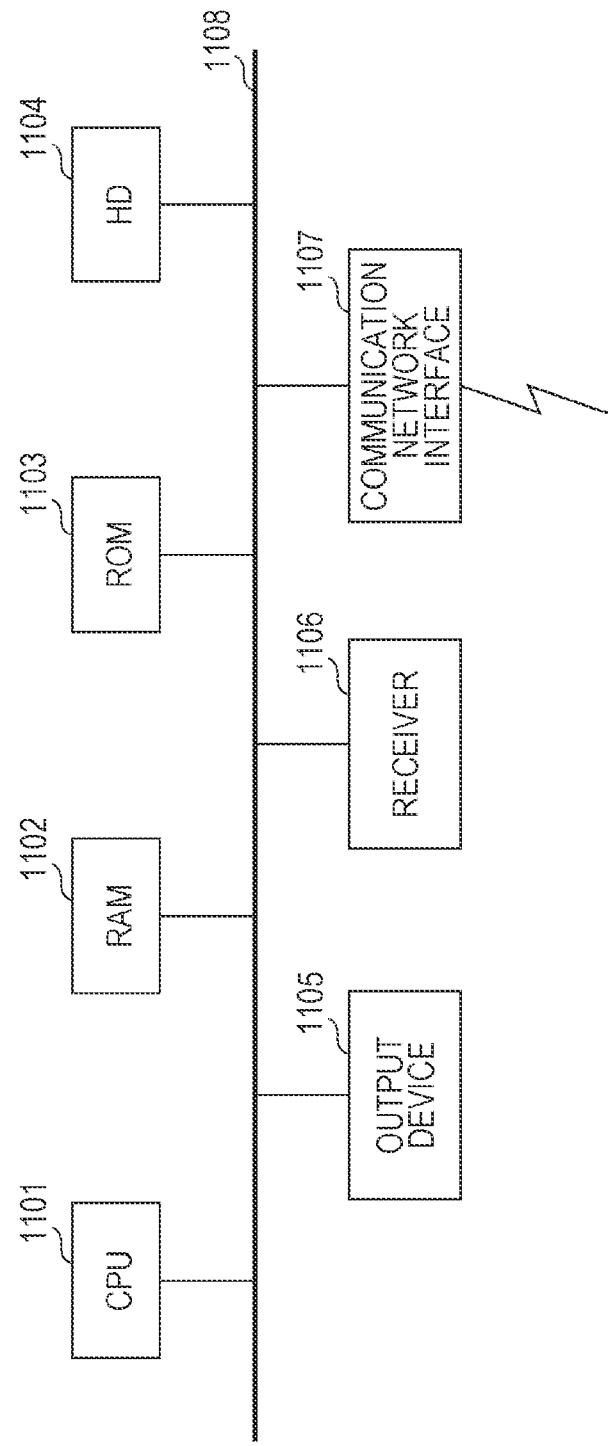
FIG. 11 is a block diagram illustrating a hardware configuration of a computer that implements the exemplary embodiment.

A computer hardware configuration of a computer (the mobile information terminal 100 and the document processing apparatus 200) on which programs as the exemplary embodiment run is a standard computer as illustrated in FIG. 11. Specifically, the computer hardware configuration is a computer that may serve as a personal computer or a server. More specifically, a central processing unit (CPU) 1101 is used as a processor (arithmetic processor), and a random-access memory (RAM) 1102, a read-only memory (ROM) 1103, and a hard disk drive (HD) 1104 are used as a storage device. A hard disk may be used for the HD 1104. The computer includes a CPU 1101 that executes programs of the document reception module 110, the display module 120, the user instruction reception module 130, the region information extraction module 140, the region display confirmation module 150, the display region log record module 160, the display region log transmission module 170, the document transmission module 210, the transmission destination determination module 220, the region information transmission module 230, the approval result and display region log reception module 240, the analysis module 260, and other elements. The computer further includes the RAM 1102 that stores the programs and data, the ROM 1103 that stores a program to start up the computer and other programs, the HD 1104 that is an auxiliary storage device (such as a flash memory), a receiver 1106 that receives data responsive to an operation that a user performs on a keyboard, a mouse, a touchpanel, and the like, an image output device 1105 such as a cathode ray tube (CRT) or a liquid-crystal display, a communication line interface 1107, such as a network interface card, for connection with a communication network, and a bus 1108 that interconnects these elements to exchange data thereamong. Multiple computers of this type may be interconnected to each other via a network.

A computer program of the exemplary embodiment may be read as software onto the system of the hardware configuration, and the exemplary embodiment is thus implemented with the software and hardware resources operating in concert.

The hardware configuration of FIG. 11 is discussed for exemplary purposes only. The exemplary embodiment is not limited to this hardware configuration of FIG. 11 and may be acceptable in any form as long as the modules of the exemplary embodiment are implemented. For example, some modules may be implemented using an application specific integrated circuit (ASIC) or the like. In another example, some modules may be in an external system and connected to the system of FIG. 11 via a communication network. In yet another example, plural systems of FIG. 11 may be interconnected to each other via a communication line such that the systems operate in concert with each other. One of the modules may be incorporated not only in a personal computer, but also in a network home appliance, a copying machine, a facsimile device, a scanner, a printer, a multi-function apparatus (an image processing apparatus having at least two of the functions of the scanner, the printer, the copying machine, and the facsimile device).

In the above-discussion of comparison of predetermined values, terms "equal to or above", "equal to or below", "larger than", and "smaller than (less than)" are respectively interpreted as being "larger than", "smaller than (less than)", "equal to or above", and "equal to or below" as long as consistency is assured in the word usage.

The above-described program may be supplied in a stored state on a recording medium. The program may also be provided via communications. In such a case, the above-described program may be understood as an invention of a "non-transitory computer readable recording medium storing the program".

The "non-transitory computer readable recording medium storing the program" refers to a computer readable recording medium storing the program, and is used to install the program, to execute the program, or to distribute the program.

The recording media include digital versatile disc (DVD), compact disc (CD), Blu-ray disc (registered trademark), magnetooptical disc (MO), flexible disc (FD), magnetic tape, hard disc, read-only memory (ROM), electronically erasable and programmable read-only memory (EEPROM (registered trademark)), flash memory, random-access memory (RAM), and secure digital (SD) memory card. The DVDs include "DVD-R, DVD-RW, and DVD-RAM" complying with the standard formulated by the DVD forum, and "DVD+R and DVD+RW" complying with DVD+RW standards. The CDs include read-only CD (CD-ROM), recordable CD-R, and rewritable CD-RW.

The program in whole or in part may be stored on the recording medium for storage and distribution. The program in whole or in part may be transmitted via a transfer medium. The transfer media include a wired network, a wireless network, or a combination thereof. The wired and wireless networks may include a local-area network (LAN), a metropolitan-area network (MAN), a wide-area network (WAN), the Internet, an intranet, and an extranet. The program in whole or in part may be transmitted over a carrier wave.

The program may be part of another program, or may be stored on the recording medium together with another program. The program may be split and split programs may then be separately stored on the recording media. The program may be processed in any fashion before being stored as long as the program remains restorable. For example, the program may be compressed or encrypted before storage.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display configured to display a document in response to an instruction from an operator; and
a processor configured to execute:
a retrieval unit configured to retrieve information related to a region within the displayed document, a duration of time during which the region is displayed, and a resolution at which the region is displayed;
an output unit configured to output the displayed document with the retrieved information related to the region, the duration of time and the resolution associated therewith, wherein the resolution associated with the region of the document is different from another resolution associated with another region in the document;
an analysis unit configured to determine whether the region within the displayed document is displayed at the resolution associated with the region of the document, which is different from the other resolution associated with another region in the document, for a time period equal to or greater than the retrieved duration of time,
an instruction reception unit configured to receive an operation to be performed on the displayed document,
wherein the analysis unit is further configured to determine whether the region within the displayed document is displayed at the resolution associated with the region of the document in response to the operation received by the instruction reception unit, and
wherein the output unit is further configured to control an output information in response to a result of the determination by the analysis unit.

2. The information processing apparatus according to claim 1, wherein information related to a region to be displayed is attached to the document, and
wherein the display displays the region of the document in accordance with the information at a resolution equal to or above a specific resolution.

3. The information processing apparatus according to claim 1, further comprising:
an input unit configured to input designation of the region in the document, the region designated to be displayed at a higher resolution than a predetermined resolution value or for a longer period of time than a predetermined time value,
wherein the output unit is further configured to control an output information indicating if the region was displayed at the higher resolution than the predetermined resolution value or for the longer period of time than the predetermined time value.

4. The information processing apparatus according to claim 3, wherein the output unit is further configured to control so that the region in the document which was displayed at the higher resolution or for the longer period of time is displayed in a different color than the other region in the document.

5. The information processing apparatus according to claim 3, further comprising a control unit configured to allow a reviewer of the document to approve the document in response to determining that the reviewer displayed at least the region of the document at the higher resolution or for the longer period of time and restrict the reviewer of the document to approve the document in response to determining that the reviewer did not display at least the region of the document at the higher resolution or for the longer period of time.

6. The information processing apparatus according to claim 1, wherein the information retrieved by the retrieval unit is previously recorded information, which is recorded in association with the region within the displayed document, by an operation separate from any operation performed on the document while the document is displayed on the display.

* * * * *